United States Patent [19]
Hart

[11] Patent Number: 5,548,983
[45] Date of Patent: Aug. 27, 1996

[54] STEERING WHEEL LOCK

[76] Inventor: Lemuel R. Hart, 30424 Center Ave., Box 36, Keller, Va. 23401

[21] Appl. No.: 494,547

[22] Filed: Jun. 26, 1995

[51] Int. Cl.⁶ ................................................. B60R 25/02
[52] U.S. Cl. .................... 70/209; 70/226; 70/237
[58] Field of Search ........................ 70/209, 211, 212, 70/225, 226, 237, 238, 18, 19; D8/331–333, 336

[56] References Cited

U.S. PATENT DOCUMENTS

| D. 347,988 | 6/1994 | Thorne | D8/333 |
| 616,845 | 12/1898 | Johnson | 70/226 |
| 1,193,737 | 8/1916 | Thomas | 70/212 |
| 1,218,856 | 3/1917 | Gulden | 70/212 |
| 1,250,207 | 12/1917 | Mushaway | 70/212 |
| 1,251,243 | 12/1917 | Koehler | 70/212 |
| 1,268,225 | 6/1918 | Flack | 70/212 |
| 1,305,563 | 6/1919 | Poland | 70/226 |
| 3,748,876 | 7/1973 | Mathews | D8/333 X |
| 5,381,679 | 1/1995 | Cummins | 70/238 X |
| 5,450,736 | 9/1995 | Volkmar | 70/209 |

Primary Examiner—Lloyd A. Gall

[57] ABSTRACT

A lock for limiting movement of a vehicle steering wheel. The inventive device includes a lower receiver for engaging a lower portion of a rim of a steering wheel. Lateral receivers are pivotally mounted to the lower receiver and operate to receive lateral portions of the rim. A lock assembly extends between the lateral receivers and projects beyond one of the receivers to limit rotation of the steering wheel to preclude theft of an associated vehicle.

6 Claims, 3 Drawing Sheets

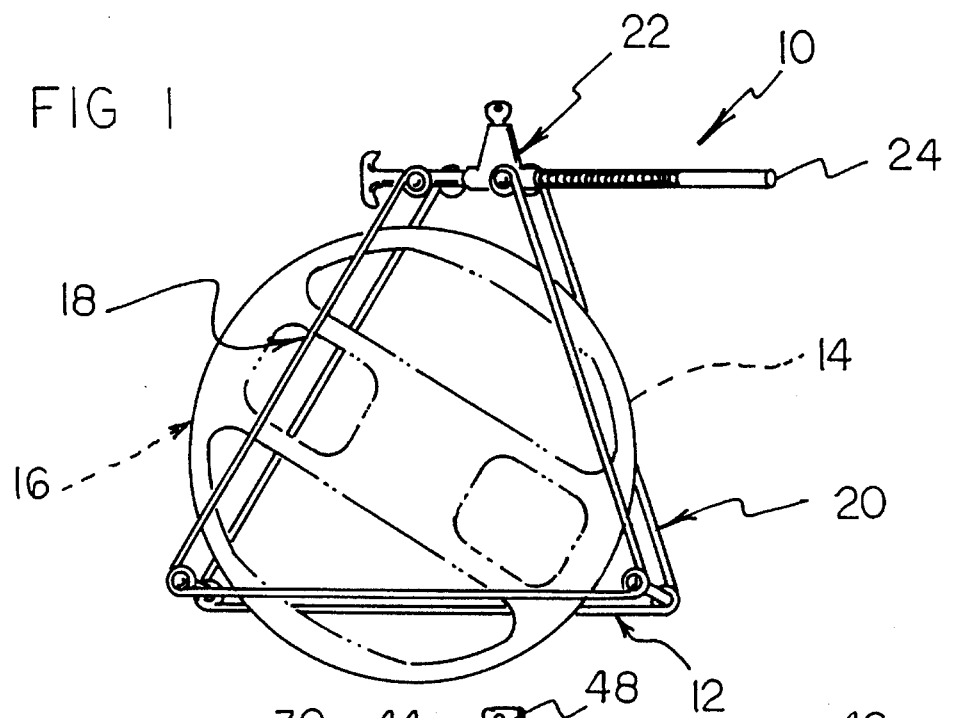
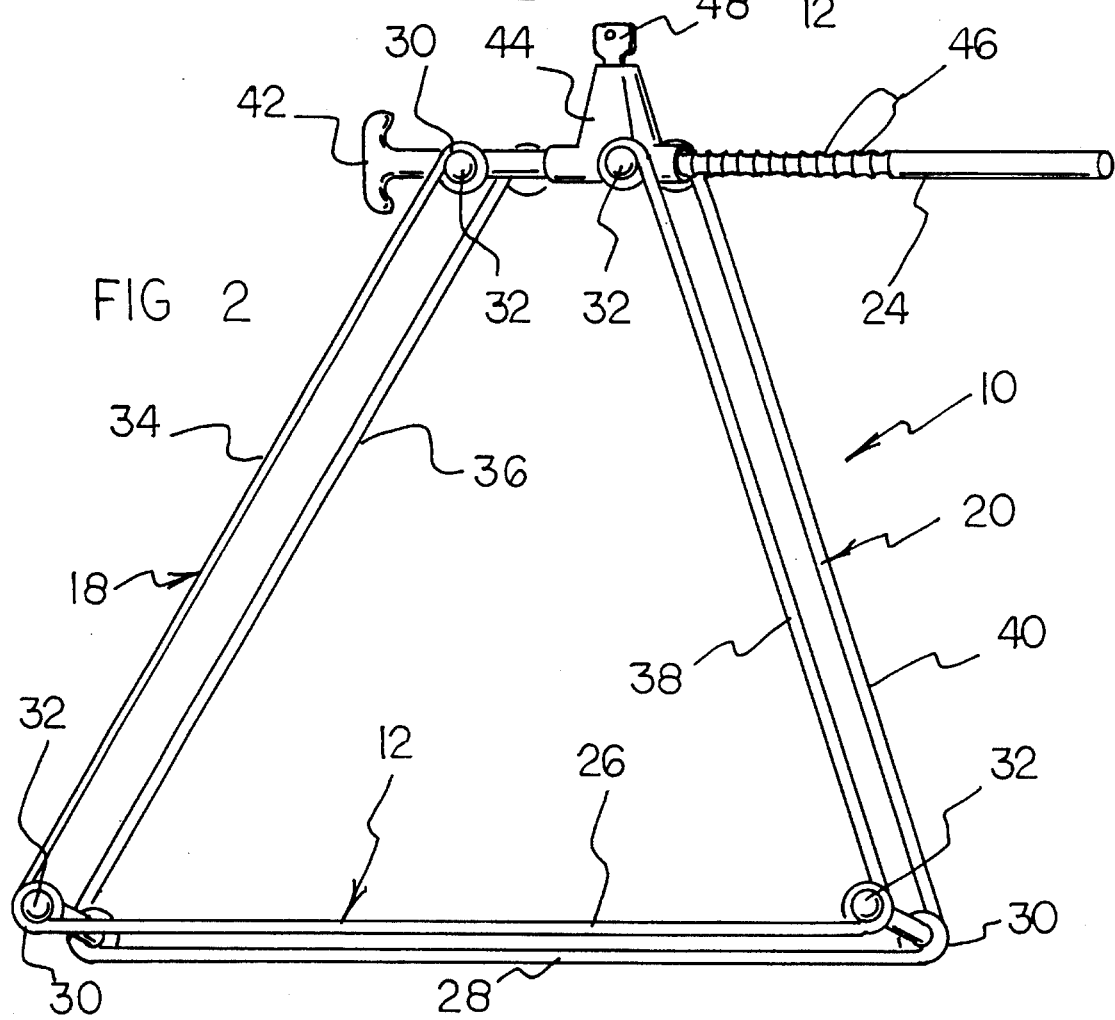

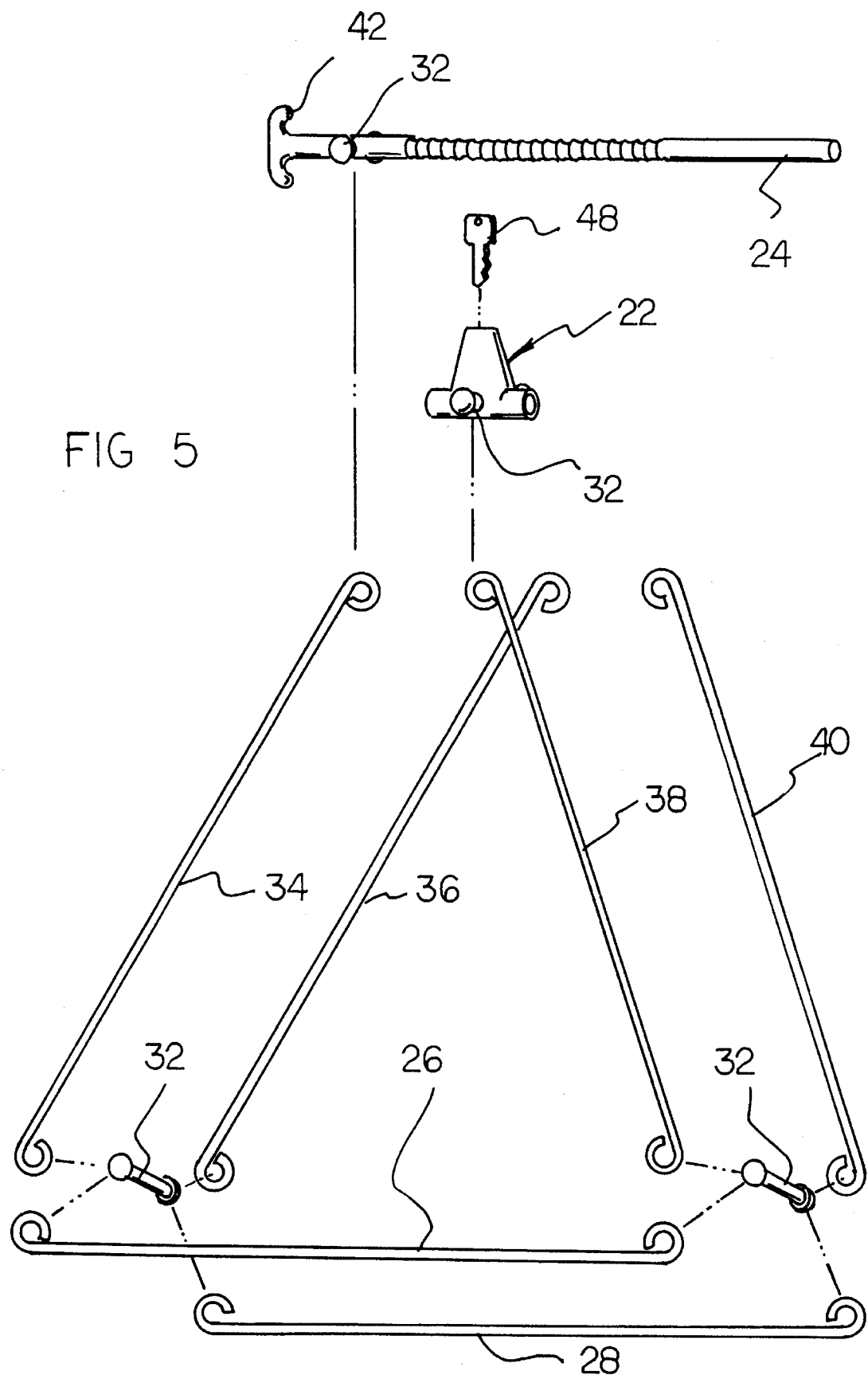

5,548,983

STEERING WHEEL LOCK

BACKGROUND OF THE INVENTION

1. Field of the Invention

The present invention relates to vehicle anti-theft devices and more particularly pertains to a steering wheel lock for limiting movement of a vehicle steering wheel.

2. Description of the Prior Art

The use of vehicle anti-theft devices is known in the prior art. More specifically, vehicle anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle anti-theft devices include U.S. Pat. No. 4,949,561; U.S. Pat. No. 5,353,614; U.S. Pat. No. 5,197,308; U.S. Pat. No. 5,157,951; U.S. Pat. No. 5,239,849; and U.S. Pat. No. 5,258,741.

While these devices fulfill their respective, particular objectives and requirements, the aforementioned patents do not disclose a steering wheel lock for limiting movement of a vehicle steering wheel which includes a lower receiver for engaging a lower portion of a rim of a steering wheel, lateral receivers pivotally mounted to the lower receiver for receiving lateral portions of the rim, and a lock assembly extending between the lateral receivers and projecting beyond one of the receivers to limit rotation of the steering wheel to preclude theft of an associated vehicle.

In these respects, the steering wheel lock according to the present invention substantially departs from the conventional concepts and designs of the prior art, and in so doing provides an apparatus primarily developed for the purpose of limiting movement of a vehicle steering wheel.

SUMMARY OF THE INVENTION

In view of the foregoing disadvantages inherent in the known types of vehicle anti-theft devices now present in the prior art, the present invention provides a new steering wheel lock construction wherein the same can be utilized for limiting movement of a vehicle steering wheel. As such, the general purpose of the present invention, which will be described subsequently in greater detail, is to provide a new steering wheel lock apparatus and method which has many of the advantages of the vehicle anti-theft devices mentioned heretofore and many novel features that result in a steering wheel lock which is not anticipated, rendered obvious, suggested, or even implied by any of the prior art vehicle anti-theft devices, either alone or in any combination thereof.

To attain this, the present invention generally comprises a lock for limiting movement of a vehicle steering wheel. The inventive device includes a lower receiver for engaging a lower portion of a rim of a steering wheel. Lateral receivers are pivotally mounted to the lower receiver and operate to receive lateral portions of the rim. A lock assembly extends between the lateral receivers and projects beyond one of the receivers to limit rotation of the steering wheel to preclude theft of an associated vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new steering wheel lock apparatus and method which has many of the advantages of the vehicle anti-theft devices mentioned heretofore and many novel features that result in a steering wheel lock which is not anticipated, rendered obvious, suggested, or even implied by any of the prior art vehicle anti-theft devices, either alone or in any combination thereof.

It is another object of the present invention to provide a new steering wheel lock which may be easily and efficiently manufactured and marketed.

It is a further object of the present invention to provide a new steering wheel lock which is of a durable and reliable construction.

An even further object of the present invention is to provide a new steering wheel lock which is susceptible of a low cost of manufacture with regard to both materials and labor, and which accordingly is then susceptible of low prices of sale to the consuming public, thereby making such steering wheel locks economically available to the buying public.

Still yet another object of the present invention is to provide a new steering wheel lock which provides in the apparatuses and methods of the prior art some of the advantages thereof, while simultaneously overcoming some of the disadvantages normally associated therewith.

Still another object of the present invention is to provide a new steering wheel lock for limiting movement of a vehicle steering wheel.

Yet another object of the present invention is to provide a new steering wheel lock which includes a lower receiver for engaging a lower portion of a rim of a steering wheel, lateral receivers pivotally mounted to the lower receiver for receiving lateral portions of the rim, and a lock assembly extending between the lateral receivers and projecting beyond one of the receivers to limit rotation of the steering wheel to preclude theft of an associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a steering wheel lock according to the present invention in use.

FIG. 2 is an isometric illustration of the present invention, per se.

FIG. 5 is an exploded isometric illustration of the invention.

DESCRIPTION OF THE PREFERRED EMBODIMENT

Figure 3:
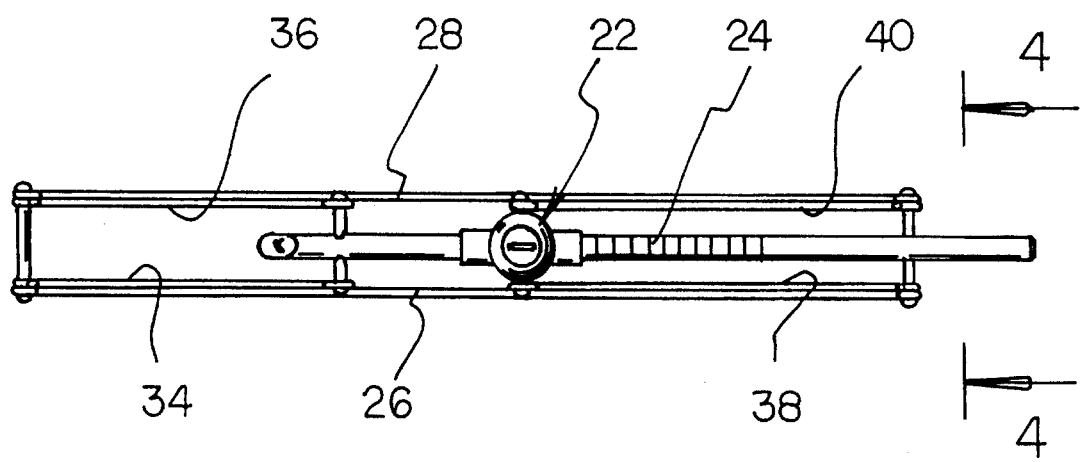
FIG. 3 is a top plan view thereof.
Figure 4:
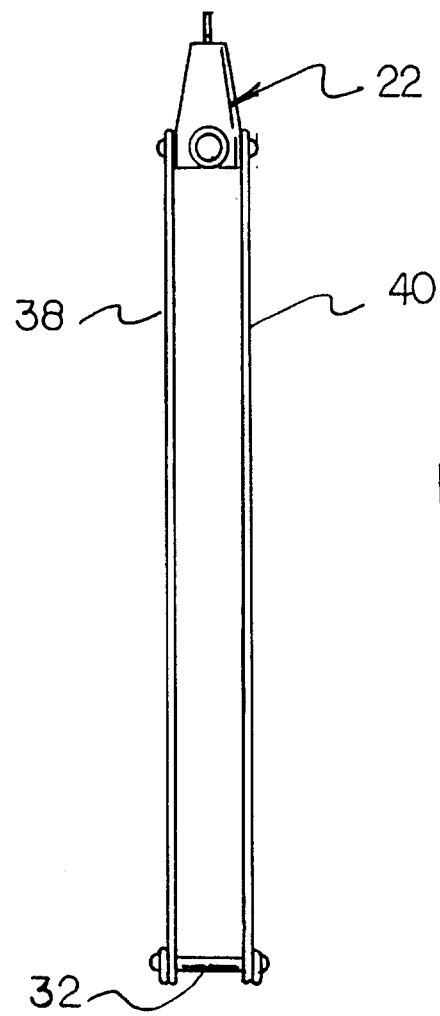
FIG. 4 is an end elevation view of the invention taken from line 4—4 of FIG. 3.

With reference now to the drawings, and in particular to FIGS. 1–5 thereof, a new steering wheel lock embodying the principles and concepts of the present invention and generally designated by the reference numeral 10 will be described.

More specifically, it will be noted that the steering wheel lock 10 comprises a lower receiver 12 for receiving a lower portion of a rim 14 of a steering wheel 16 as shown in FIG. 1 of the drawings. A first lateral receiver 18 is pivotally mounted to a first end of the lower receiver 12 and operates to receive a lateral portion of the rim 14. Similarly, a second lateral receiver 20 is pivotally mounted to a second end of the lower receiver 12 and operates to receive a second lateral portion of the rim 14. A lock means 22 extends between free distal ends of the lateral receivers 18 and 20 for selectively locking the free distal ends thereof together to secure the rim 14 of the steering wheel 16 within the receivers 12, 18, and 20. The lock means 22 includes a lock rod 24 projecting beyond one of the lateral receivers 18 or 20 so as to limit rotation of the steering wheel 16 as the lock rod 24 engages adjacent components of an associated vehicle interior. By this structure, an individual can secure a steering wheel 16 to preclude theft of an associated vehicle.

Referring now to FIGS. 2 through 5 wherein the present invention 10 is illustrated in detail, it can be shown that the lower receiver 12 preferably comprises an elongated outer lower member 26 positioned in a substantially spaced and parallel orientation relative to an elongated inner lower member 28. Ends of both of the outer lower member 26 and the inner lower member 28 are shaped so as to define eyelets 30 of closed annular configuration through which pivot pins 32 project to maintain the lower members in the substantially spaced and parallel orientation illustrated in the figures. With continuing reference to FIGS. 2 through 5, it can be shown that the first lateral receiver 18 similarly comprises a first outer lateral member 34 spaced from and parallel to a first inner lateral member 36. Ends of the first outer lateral member 34 and the first inner lateral member 36 are shaped so as to define eyelets 30 through which the pivot pins 32 project. The second lateral receiver 20 also similarly comprises a second outer lateral member 38 spaced from and parallel to a second inner lateral member 40, with ends of the second outer lateral member and second inner lateral member being shaped so as to define eyelets 30 through which the pivot pins 32 project. By this structure, the rim 14 of the steering wheel 16 can be received between the members of the respective receivers 12, 18, and 20.

The lock means 22 of the present invention 10, as shown in FIGS. 2 through 5, preferably comprises a handle 42 pivotally mounted to the eyelets 30 of the lateral members 34 and 36 of the first lateral receiver 18 by one of the pivot pins 32 directed therethrough. The lock rod 24 projects from the handle 42 and through a lock body 44. The lock body 44 is pivotally mounted to the eyelets 30 of the lateral member 38 and 40 of the second lateral receiver 20 by truncated pivot pins 32 extending from the lock body 44 through the eyelets. The lock rod 24 is shaped so as to define a plurality of annular grooves 46 extending in a substantially spaced and parallel orientation along a longitudinal length of the lock rod which can be engaged by conventionally known components located within the lock body 44 and actuated by a key 48 insertable thereinto. Examples of suitable locking structure for incorporation into the lock body 44 for engaging the annular grooves 46 of the lock rod 24 in response to a rotation of the key 48 can be found within the U.S. Pat. Nos. 5,144,822; 5,142,889; 5,131,245; and 5,129,245, all of which are incorporated herein by reference. By this structure, an individual is permitted to pivotally position the lateral receivers 18 and 20 about lateral portions of the rim 14 and secure the free distal ends of the lateral receivers together by a telescopic positioning of the lock rod 24 through the lock body 44, whereby the lock rod 24 projects laterally of the device 10 so as to engage surrounding components of the vehicle interior during rotation of the steering wheel 16, thereby limiting rotational traveling of the steering wheel to preclude theft of the associated vehicle.

In use, the steering wheel lock 10 of the present invention can be easily utilized to secure a steering wheel 16 within a vehicle. The present invention 10 serves to limit rotation of the steering wheel 16 so as to preclude theft of an associated vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is:

1. A steering wheel lock comprising:

a lower receiver adapted to receive a lower portion of a rim of a steering wheel;

a first lateral receiver pivotally mounted to a first end of the lower receiver and adapted to receive a lateral portion of the rim;

a second lateral receiver pivotally mounted to a second end of the lower receiver and adapted to receive a second lateral portion of the rim;

a lock means extending between free distal ends of the lateral receivers for selectively locking the free distal ends thereof together to secure the rim of the steering wheel within the receivers; said receivers, when in a locked condition on a steering wheel, including three substantially straight members on a front side and three substantially straight members on a rear side of a rim of the steering wheel, each member including an eyelet means at both of its ends for being pivoted to an adjacent element, members on the front side of the rim being substantially parallel to those on the rear side of the rim for receipt of the steering wheel rim therebetween.

2. The steering wheel lock of claim 1, wherein the lock means includes a lock rod projecting beyond one of the lateral receivers so as to limit rotation of the steering wheel as the lock rod operates to engage adjacent components of a vehicle interior.

3. The steering wheel lock of claim 2, wherein the lower receiver comprises an elongated outer lower member, and an elongated inner lower member positioned in a substantially spaced and parallel orientation relative to the elongated outer lower member, the lower members each having spaced first and second ends, with the first ends of both of the outer lower member and the inner lower member being coupled together in a spaced and parallel orientation, and the second ends of both of the outer lower member and the inner lower member being coupled together in a spaced and parallel orientation; and further wherein the first lateral receiver comprises a first outer lateral member, and a first inner lateral member spaced from and oriented parallel to the first outer lateral member, the first inner and outer lateral members each including spaced first and second ends, with the ends of the first outer lateral member and the first inner lateral member being coupled together in a spaced and parallel orientation, with the first ends of the first outer lateral member and the first inner lateral member being pivotally coupled to the first ends of the outer lower member and the inner lower member; and further wherein the second lateral receiver comprises a second outer lateral member, and a second inner lateral member spaced from and oriented parallel to the second outer lateral member, the second inner and outer lateral members each including spaced first and second ends, with the ends of the second outer lateral member and the second inner lateral member being coupled together in a spaced and parallel orientation, with the second ends of the second outer lateral member and the second inner lateral member being pivotally coupled to the second ends of the outer lower member and the inner lower member.

4. The steering wheel lock of claim 3, wherein the ends of both of the outer lower member and the inner lower member are shaped so as to define eyelets of closed annular configuration; and further comprising pivot pins projecting through the eyelets to maintain the lower members in the substantially spaced and parallel orientation; and further wherein the ends of both pairs of the outer and inner lateral members are each shaped so as to define eyelets, with the pivot pins of the lower receiver extending through the eyelets of the outer and inner lateral members.

5. The steering wheel lock of claim 4, wherein the lock means comprises a handle pivotally mounted to the eyelets of the lateral members of the first lateral receiver; the lock rod projecting from the handle; a lock body pivotally mounted to the eyelets of the lateral members of the second lateral receiver, the lock body receiving the lock rod therethrough.

6. The steering wheel lock of claim 5, wherein the lock rod is shaped so as to define a plurality of annular grooves extending in a substantially spaced and parallel orientation along a longitudinal length of the lock rod.

* * * * *